Patented Jan. 13, 1931

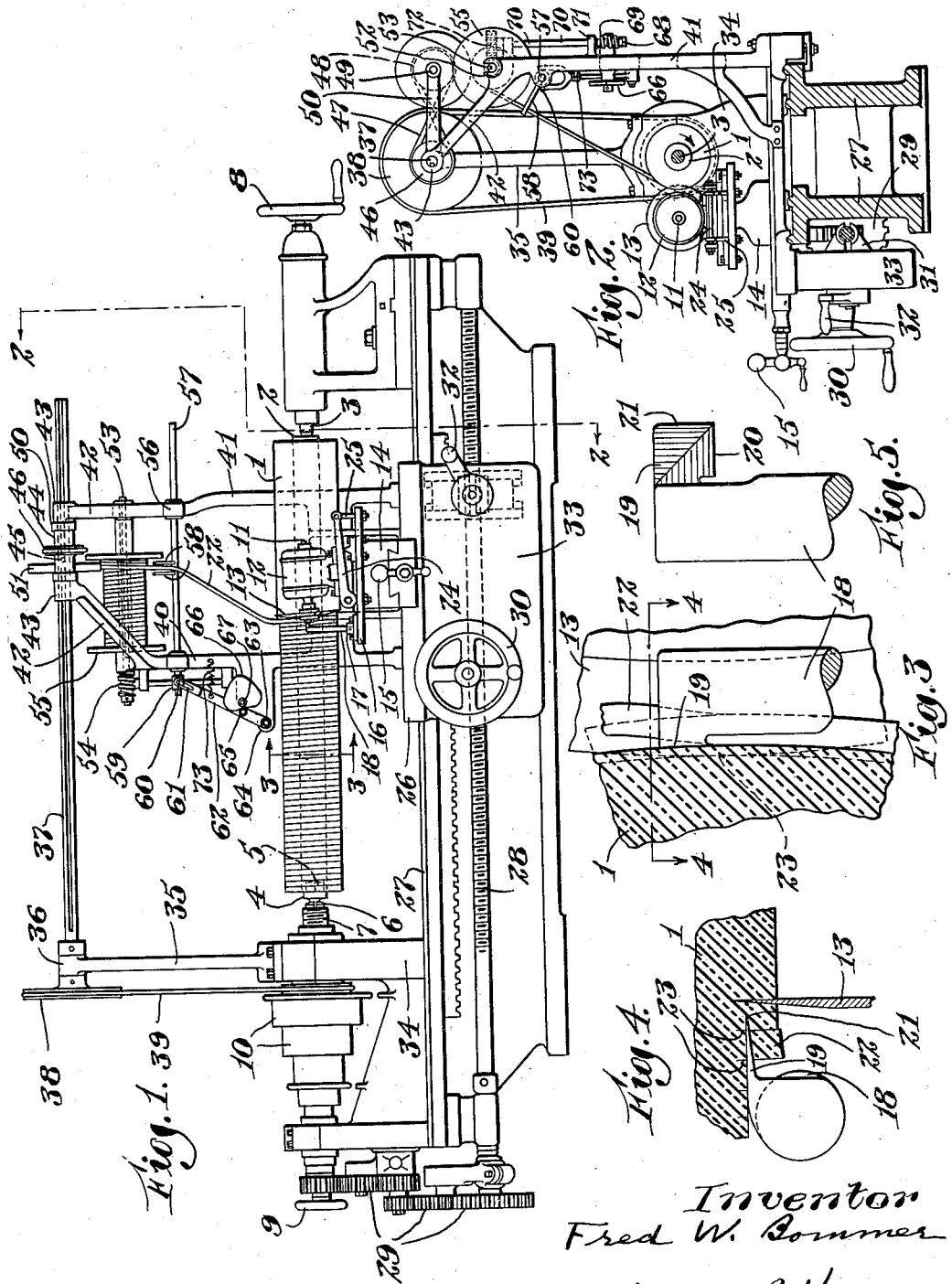

1,788,615

UNITED STATES PATENT OFFICE

FRED W. BOMMER, OF EVERETT, MASSACHUSETTS

RUBBER-THREAD-CUTTING MACHINE

Application filed July 3, 1928. Serial No. 290,138.

My present invention relates to thread cutting machines, and more particularly to a novel machine for severing, forming or cutting a rubber thread from cylindrical stock.

An important object of the present invention is to provide a machine which will cut a rubber thread of predetermined width and thickness from a substantially solid cylindrical roll of rubber stock.

A further object of the invention is to provide a machine of this nature which will be economical to manufacture and operate, which will be simple and efficient in operation, and which will form or cut a rubber thread at a relatively high rate of speed.

Another object of the invention consists in the provision of novel cutting instrumentalities for forming such rubber threads. These cutting instrumentalities comprise a rotary knife, adjustable to desired position with relation to the roll of rubber from which it is desired to cut a thread, and also angularly adjustable relatively to the surface of said roll. Cooperating with said rotary knife is a second knife, arranged at a predetermined spaced distance from said rotary knife, said second knife being fixed, and having a cutting edge adapted to sever a thread from said roll, the sides of said thread having already been severed by the rotary knife during rotation of said roll. This fixed knife is also adjustable, with the rotary knife, relatively to the roll, to sever a thread of any predetermined thickness.

The rotary knife is angularly adjustable, relatively to the surface of the roll and relatively to the fixed knife, to form a thread of predetermined width. These two knives, viz., the rotary knife and the fixed knife, are movable in unison progressively along said roll, the severing of thread-forming operation taking place as said knives move along said roll.

The rotary knife is adapted to penetrate into said rubber stock to a depth greater than the thickness of the rubber thread to be formed from said stock, the fixed knife performing the severing operation at a predetermined depth for the particular rubber thread being formed.

Coupled with the novel features above briefly outlined, is a novel winding mechanism, to wind the severed thread. This winding mechanism comprises a spool, rotatable by a friction device during operation of the machine, said friction device bearing directly against the rubber thread as it is wound on the spool. A guiding element, automatically operated by the spool in its winding rotation, is also provided, whereby level winding of the severed thread upon the said spool is assured. This level winding device is both cam and spring operated, movement in one dircetion being controlled by a cam, and in the other direction by a suitable spring.

I believe that my present device, as above briefly explained, is novel, and I have therefore claimed the same broadly in the present application.

The above and other objects of the invention, features, details of construction, combinations of parts, and advantages, will be hereinafter more fully pointed out, described and claimed.

Referring to the drawings, illustrating a preferred embodiment of the invention, Fig. 1 is a side elevation of a machine embodying the novel features of my invention, Fig. 2 is a vertical sectional view on the line 2—2 of Fig. 1;

Fig. 3 is a vertical sectional view, on enlarged scale, on the line 3—3 of Fig. 1;

Fig. 4 is a cross-sectional view on the line 4—4 of Fig. 3; and

Fig. 5 is an enlarged fragmentary detail view of the fixed cutting knife.

Referring now to the drawings, for a particular description of my invention, its construction and operation, 1 designates the rubber stock, which is preferably in the form of a solid roll molded onto a mandrel 2. This stock 1, as will be readily appreciated, is of considerably greater thickness than the thread which it is intended to cut therefrom. The mandrel 2 is mounted between a tail stock 3 and a center 4, said center having a squared end 5 adapted to seat in a correspondingly squared recess in one end of the mandrel 2, said center 4 also being gripped in the spindle 6 in the chuck 7. The tail stock 3 is operated and adjusted by means of a hand wheel 8, while the spindle 6 and chuck 7 are adjusted by means of a hand wheel 9. The spindle 6 and center 4 are driven through cone pulleys 10 from a suitable source of power (not shown), thus rotating the mandrel 2 and the substantially solid stock 1 carried thereby. It will be noted that the mandrel 2, while rotatable by means of the center 4, is fixed against longitudinal movement. Mounted on the shaft 11 of a motor 12 is a circular cutting knife 13, adapted to be rotated by the motor 12. The motor 12 is mounted on a cross-slide 14, operable and adjustable by a handle 15, so that the knife 13 may be adjusted to and from the stock 1, to make a cut therein of any predetermined depth.

Mounted also on the plate 16 on the cross-slide 14 is a holder 17, carrying a knife handle 18 on which is a cutting blade 19. This cutting blade 19 has a cutting edge 20 adapted to be presented to the stock 1 as it is being rotated. A cutting edge 21 may also be formed on the blade 19, to facilitate penetration into the stock 1 as the blade is advanced therealong. During operation the rotary cutting knife or wheel 13 is adapted to penetrate into the stock 1 to a greater depth than that predetermined for the thread 22 to be cut from the said stock. Thus, as illustrated in Figs. 3 and 4, the rotary knife penetrates to the point indicated at 23. The knife blade 19 is fixed in a predetermined position with relation to the rotary blade 13, said position not being as deep in the stock 1 as the depth to which the rotary knife penetrates, thus insuring perfect and complete severing of the thread 22 from the stock 1. As the knives advance along the stock 1, the rotary knife 13 forms, by its cutting action, the sides of the thread 22, while the fixed blade 19 forms the back of said thread, as said stock is being rotated during the forward feeding of the knives.

If a narrower or wider thread is desired, the rotary knife 13 may be angularly adjusted, relative to the fixed knife blade 19, by means of the rocker plate 24 on which the motor 12 and knife 13 are mounted, said rocker plate being adjusted by means of the bolts 25.

The cross-slide 14 is mounted in the saddle 26 movable longitudinally of the bed 27 by the lead screw 28 connected through the gears 29 to the pulleys 10. An apron hand wheel 30 is provided if it is desired to move the saddle 26 manually, in the usual manner. The saddle 26 is operatively connected to the lead screw 28, when power driven, through a nut cam 31 operated by a handle 32, said handle being outside of the apron 33.

It will thus be seen that when power is transmitted to the pulleys 10, the mandrel 2 and stock 1 will be rotated, and both the rotary knife 13 and fixed blade 19 will be moved along the stock 1, to the right, as viewed in Fig. 1, said rotary knife 13 being in turn rotated by the motor 12, cutting the sides of the thread 22 and the cutting edge 20 cutting the back of the said thread as the stock 1 is presented thereto during its rotation.

I have also devised novel mechanism to wind the rubber thread 22, and said mechanism will now be described. Mounted on a support 34 on the bed 27, is a standard 35 carrying in a bearing 36 at its upper end a splined shaft 37. This shaft has mounted thereon, at one end, a pulley 38 driven, by means of a belt 39, from the cone pulleys 10. Mounted on the saddle 26 are a pair of standards 40 and 41, each of these standards having an inwardly and upwardly inclined arm 42 with suitable bearings 43 for the shaft 37. Mounted on the shaft 37, between the bearings 43, is a sleeve 44 splined to the shaft 37 by a key or pin 45, said sleeve carrying a pulley 46 on which is a belt 47 connected to a pulley 48 on a shaft 49, carried in the outer ends of rocker arms 50 pivotally mounted on the shaft 37. Mounted also on the shaft 49, and adapted to be rotated by the belt 47, is a friction roller 51. The upper ends of the standards 40 and 41 are yoked, as shown at 52, and in these yokes rests a shaft 53 carrying at one end a worm 54. Splined to the shaft 53 is a spool 55 on which the rubber thread 22 is to be wound. The friction roller 51 is adapted to rest on the thread 22 and when said roller is rotated, by the belt 47, said roller will in turn impart rotation to said spool 55, winding the thread 22 thereon, as it is cut from the stock 1 by the knives 13 and 19.

The friction roller 51 being mounted on the rocker arms 50 will, of course, be elevated as the spool 55 fills with thread, and when the spool is filled to its desired capacity, the shaft 53 may be raised from the yokes 52 and the spool 55 removed longitudinally thereof, the roller 51 being first raised on the rocker arms 50, clear of the spool 55, or being raised by the spool during the operation of its removal.

To insure level winding of the thread 22 on its spool 55, I provide, in the bearings 56 on the standards 40 and 41, a shaft 57, carrying a pair of guide rods 58, between which the thread 22 passes on its way to the spool 55. On one end of the shaft 57 is a collar 59 with a pin 60 thereon, said pin entering a slot 61 in the yoked end of the lever 62. This lever is pivoted at its lower end at 63 to a boss 64 on the standard 40 and has thereon a roller 65 adapted to be engaged by a cam 66 mounted on a pin 67, said pin having, on the end opposite the cam 66, a pinion 68 adapted to be engaged by a worm 69 on a vertical shaft 70 having bearings in lugs or bosses 71 on the standard 40. The upper end of this shaft 70 carries a pinion 72 adapted to be engaged and rotated by the worm 54 on the shaft 53. The worm 54 is, of course, rotated by the action of the friction roller 51 on the rubber thread 22 being wound on the spool 55.

Rotation thus being imparted to the cam 66, the lever 62 will be oscillated on its pivot 63, moving the shaft 57 longitudinally of the spool 55 in predetermined timed relation with the winding of the thread 22 thereon, thus insuring that the thread 22 will be wound in a level manner on its spool. Movement of the shaft 57 to the left, Fig. 1, is caused by the cam 66, and movement to the right is caused by the tension of the coiled spring 73, the cam moving the lever 62 to the left against the tension of said coiled spring 73.

The operation of my present novel machine is simple, and will be readily understood, being briefly described as follows:

Power being transmitted to the pulleys 10, the mandrel 2 will be rotated, together with the rubber stock 1 thereon. Simultaneously the saddle 26 will be moved longitudinally of the mandrel 2, carrying the motor 12 and knives 13 and 19 therewith. The knives will cut from the stock 1 the thread 22 in the manner heretofore described, which thread will be led and secured to the spool 55 for winding thereon. As the thread is being cut, the friction roller 51 will be rotated through the belts 39 and 47, as above explained, winding the thread on the spool and simultaneously causing operation of the guides 58 through the medium of the oscillating lever 62. On completion of the winding operation, or when the spool 55 is filled to its desired capacity, said spool may be removed from the yoked ends of the standards in the manner above described, and a new or empty spool replaced, whereupon the machine will be ready for continued operation, fresh mandrels with the substantially solid rubber stock thereon being replaced, of course, when the stock being operated on is exhausted. The knives will be run over the stock again and again, until the entire stock 1 is exhausted.

My present machine is efficient, simple, and rapid of operation, and these facts will instantly appeal to those skilled in this art.

While I have necessarily described my present invention somewhat in detail, it will be appreciated that I may vary the size, shape and arrangement of parts within reasonably wide limits without departing from the spirit of the invention.

My invention is further described and defined in the form of claims as follows:

1. In a machine for cutting rubber threads from a roll of rubber stock of greater thickness than the threads to be cut, means for supporting said roll, a pair of knives angularly disposed with relation to each other, means to rotate said roll with relation to said knives, and means to move said knives progressively lengthwise the axis of said roll to cut a helical thread therefrom.

2. In a machine for cutting rubber threads from a roll of rubber stock of greater thickness than the threads to be cut, a mandrel for supporting said roll, a rotary knife, a knife fixed in a position relative to said rotary knife, and means to move said knives progressively lengthwise the axis of said mandrel to cut a helical thread from said roll.

3. In a machine for cutting rubber threads from a roll of rubber stock of greater thickness than the threads to be cut, means for supporting said roll, means to rotate said roll, a rotary knife positioned to penetrate a predetermined distance into said stock, and a knife fixed in a position relative to said rotary knife and adapted to sever a thread from said roll.

4. In a machine for cutting rubber threads from a roll of rubber stock of greater thickness than the threads to be cut, means to support and rotate said roll, a rotary knife positioned to penetrate a predetermined distance into said stock, and a knife fixed in a position relative to said rotary knife and adapted to sever a thread from said roll, said fixed knife severing said thread at a depth less than the penetration of said rotary knife.

5. In a machine for cutting rubber threads from a roll of rubber stock of greater thickness than the threads to be cut, means to support and rotate said roll, a rotary knife positioned to penetrate a predetermined distance into said stock, a knife fixed in a position relative to said rotary knife and adapted to sever a thread from said roll, and means to adjust the inclination of said rotary knife relative to said fixed knife.

6. In a machine for cutting rubber threads from a roll of rubber stock of greater thickness than the threads to be cut, means to support and rotate said roll, a rotary knife positioned to penetrate a predetermined distance into said stock, a knife fixed in a position relative to said rotary knife and adapted to sever a thread from said roll, and means to move said knives progressively lengthwise the axis of said roll.

7. In a machine for cutting rubber threads from a roll of rubber stock of greater thickness than the threads to be cut, means to support and rotate said roll, a rotary knife positioned to penetrate a predetermined distance into said stock, a knife fixed in a position relative to said rotary knife and adapted to sever a thread from said roll, means to move said knives progressively along said roll, and means to adjust said knives relatively to said roll.

8. In a machine for cutting rubber threads from a roll of rubber stock of greater thickness than the threads to be cut, means to support and rotate said roll, a rotary knife positioned to penetrate a predetermined distance into said stock, and a knife fixed in an angular position relative to said rotary knife and adapted to sever a thread from said roll.

9. In a machine for cutting rubber threads from a roll of rubber stock of greater thickness than the threads to be cut, means to support and rotate said roll, a rotary knife positioned to penetrate a predetermined distance into said stock, and a knife fixed in a substantially right-angled position relative to said rotary knife and adapted to sever a thread from said roll.

10. In a machine for cutting rubber threads from a roll of rubber stock of greater thickness than the thickness of the threads to be cut therefrom, a mandrel to support said roll, means to rotate said mandrel and said roll, a rotary knife adjusted to penetrate a predetermined distance into said roll, a knife fixed in an angular position relative to said rotary knife and adapted to sever a thread from said roll, and means to move said two knives in unison progressively lengthwise the axis of said roll.

11. Apparatus of the character described comprising means for turning an annular rubber body, means for making a spiral cut in the face of the body, and means for making a cut in the side of the body thus to continuously remove a portion of the body in strip-formation.

In testimony whereof, I have signed my name to this specification.

FRED W. BOMMER.